Jan. 11, 1938.   H. A. STAPLES   2,105,168
ELECTRIC CABLE
Filed May 4, 1935
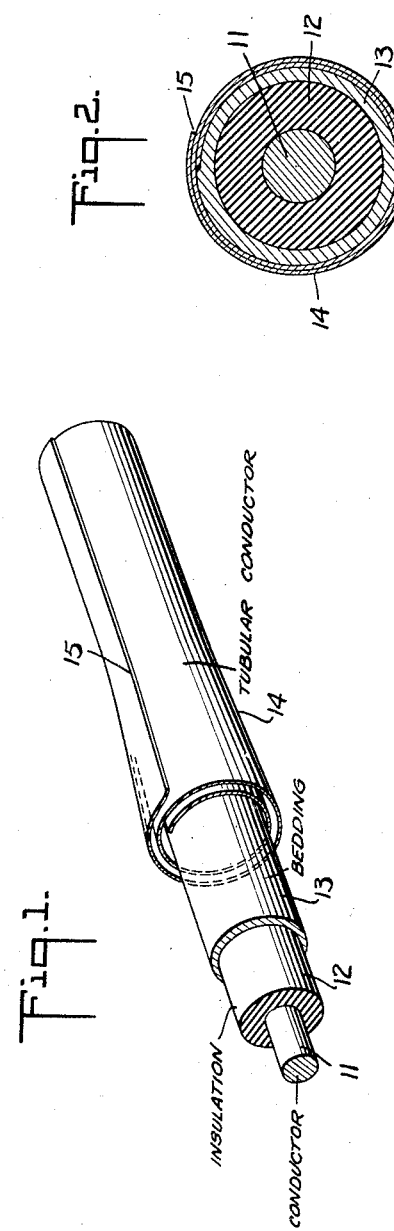
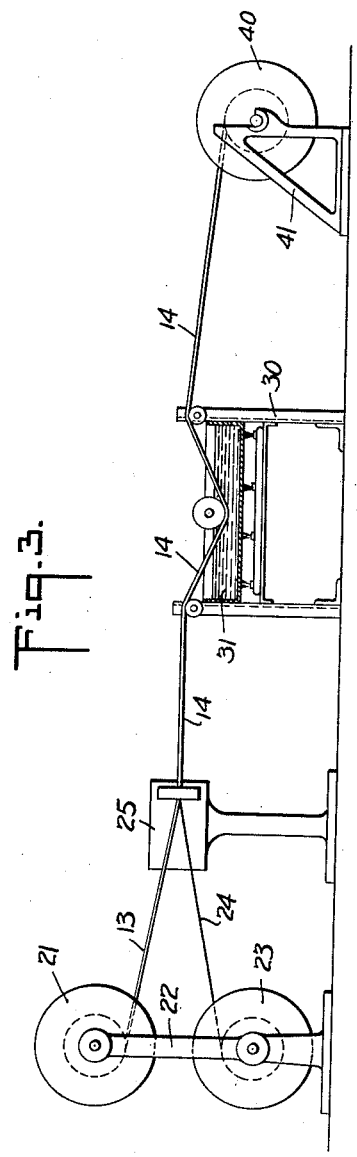
Horace A. Staples
INVENTOR
ATTORNEY Patented Jan. 11, 1938

2,105,168

UNITED STATES PATENT OFFICE 2,105,168

ELECTRIC CABLE

Horace A. Staples, Plainfield, N. J., assignor to Phelps Dodge Copper Products Corporation, New York, N. Y., a corporation of Delaware Application May 4, 1935, Serial No. 19,763

3 Claims. (Cl. 173—266)

My invention relates to insulated cables, and more particularly to copper sheathed insulated cable for use buried in the ground or strung upon pole lines. Such a cable is primarily designed for the distribution of electrical current in rural districts where a particularly cheap construction is necessary because of the low density of population.

It has recently been realized as practical, that rural lines may operate with a single insulated conductor and one grounded conductor. It is also known that copper buried in the average soil suffers substantially 10% of the amount of corrosion which is suffered by lead under same conditions. These two basic facts have brought forth a conductor comprising a single insulated conductor enclosed in a copper sheath, the copper sheath being helically wrapped. I have discovered that if the copper sheath is applied to the insulated conductor parallel to the cable axis with a longitudinal seam instead of a helical seam the path of the current is entirely through the copper and not through any helical seam, the surface of the copper is smooth and free from corrugations which is a characteristic of helically applied tubes. With this construction the speed of manufacture may be greatly increased with corresponding decrease in cost of manufacture and the amount of the soldered seam exposed to electrical action is reduced to a minimum.

The foregoing and other features of my invention will now be described in connection with the accompanying drawing, forming part of this specification in which I have represented my cable in its preferred form, after which I shall point out more particularly in the claims those features which I believe to be new and of my own invention.

In the drawing:

Figure I is a perspective view of a section of my cable.

Figure II is a cross section thereof.

Figure III is a diagrammatic side elevation of a machine employed to make my cable.

In carrying out my invention, I employ an electrical conductor 11 which may be any well known type of conductor, solid stranded, single or multiple, made of tinned copper or other metals, covered with any suitable insulating material 12 which may be of rubber, paper or other material. Over this insulation I may use any protective covering 13 which may also act as a soft bedding for the outer protective covering 14. I intend to apply this covering or copper sheath 14 by forming a strip of copper of indefinite length and suitable width into a longitudinal seamed covering, the seam 15 being soldered or otherwise tinned. It will be observed that I show the sheath 14 as a wrap with two complete layers of metal but I do not wish to limit myself to that number as I may find varying conditions of service will require one lap or more than two laps.

If the insulation is rubber and the metal of the sheath is copper, the sheath will be tinned on its inside and/or outside face.

The thickness of the tape from which the tube 14 is formed is chosen so as to give a tube of cross section equivalent either in resistance or carrying capacity, as desired, to that of the internal conductor of my cable, making such allowances as may be dictated by practical considerations.

In Figure III I show a machine which I employ to make my cable, in which 21 is a reel of insulated conductor which is to be provided with the copper sheath. Mounted in the same frame 22 is a reel of strip copper from which the sheath 14 is to be formed. This strip is slightly greater in width than required for the number of layers around the circumference of the insulated conductor. The strip of copper 24 and the insulated conductor are fed into a forming tool 25 which forms up the flat strip 24 into a wrapping, closely fitting it around the insulated cable 13. From this point the sheathed cable 14 is drawn through the tinning or soldering device 30. This tinning device may be either a bath as shown at 31 or it may take the form of a stream of tin or solder directed to the seam 15. From there the completed cable is rolled on the reel 40 of the haul off 41.

I wish it distinctly understood that my cable herein described and illustrated is in the form in which I desire to construct it and that changes or variations may be made as may be convenient or desirable without departing from the salient features of my invention and I therefore intend the following claims to cover such modifications as naturally fall within the lines of invention.

I claim:

1. A two conductor cable comprising a pair of co-axial conductors, insulation interposed between the conductors comprising a layer of rubber adjacent the central conductor and a bedding between the insulation and the outer conductor, the outer conductor comprising a tube having substantially the same electrical resistance as the central conductor and formed from a continuous tape spirally wrapped in a plurality of layers with a longitudinal seam.

2. The cable of claim 1 with the addition that the longitudinal seam is soldered.

3. The cable of claim 1 with the addition that the tape is tinned prior to being laid upon the insulation and then soldered.

HORACE A. STAPLES.